United States Patent [19]
Yuan et al.

[11] Patent Number: 5,739,987
[45] Date of Patent: Apr. 14, 1998

[54] MAGNETORESISTIVE READ TRANSDUCERS WITH MULTIPLE LONGITUDINAL STABILIZATION LAYERS

[75] Inventors: Samuel W. Yuan, San Francisco; Daniel A. Nepela, San Jose; Marcos M. Lederman, San Francisco, all of Calif.

[73] Assignee: Read-Rite Corporation, Milpitas, Calif.

[21] Appl. No.: 658,000

[22] Filed: Jun. 4, 1996

[51] Int. Cl.$^6$ ............................ G11B 5/39; G11B 5/127
[52] U.S. Cl. .......................................... 360/113
[58] Field of Search ...................................... 360/113

[56] References Cited

U.S. PATENT DOCUMENTS

| | | | |
|---|---|---|---|
| 4,663,685 | 5/1987 | Tsang | 360/113 |
| 4,713,708 | 12/1987 | Krounbi et al. | 360/113 |
| 4,771,349 | 9/1988 | Tsang | 360/113 |
| 5,018,037 | 5/1991 | Krounbi et al. | 360/113 |
| 5,285,339 | 2/1994 | Chen et al. | 360/113 |
| 5,408,377 | 4/1995 | Gurney et al. | 360/113 |
| 5,442,508 | 8/1995 | Smith | 360/113 |
| 5,452,163 | 9/1995 | Coffey et al. | 360/113 |
| 5,465,185 | 11/1995 | Heim et al. | 360/113 |
| 5,491,600 | 2/1996 | Chen et al. | 360/113 |
| 5,528,440 | 6/1996 | Fontana et al. | 360/113 |

*Primary Examiner*—John H. Wolff
*Attorney, Agent, or Firm*—Nathan N. Kallman

[57] ABSTRACT

A read transducer assembly includes a giant magnetoresistive structure in magnetic contact with a multilayered biasing structure that includes layers of antiferromagnetic material interleaved with layers of soft magnetic material. The magnetic exchange coupling between the antiferromagnetic layers and the soft magnetic layers results in a bias field to the giant magnetoresistive structure that reduces or eliminates side reading by the read transducer assembly. The multilayered biasing structure is located adjacent to and in magnetic contact with either the end or the top surfaces of the giant magnetoresistive structure.

8 Claims, 3 Drawing Sheets

MAGNETORESISTIVE READ TRANSDUCERS WITH MULTIPLE LONGITUDINAL STABILIZATION LAYERS

FIELD OF THE INVENTION

This invention relates to magnetic transducers for reading information signals from magnetic media and in particular to improved magnetoresistive (MR) read transducers.

DESCRIPTION OF THE PRIOR ART

The prior art describes magnetic transducers, particularly, magnetoresistive (MR) sensors or heads which are capable of reading signals from a magnetic surface at great linear densities. An MR sensor detects magnetic field signals through the resistance changes of a read element made from a magnetoresistive material as a function of the amount and direction of magnetic flux being sensed by the element.

For an MR element to operate optimally, two bias fields should be provided. To bias the MR material so that its response to a flux field is linear, a transverse bias field is generally provided. This bias field is normal to the plane of the magnetic media and parallel to the surface of the planar MR element.

The other bias field which is usually employed with MR elements is referred to as a longitudinal bias field, which extends parallel both to the surface of the magnetic media and to the lengthwise direction of the MR element. The function of the longitudinal bias field is to suppress Barkhausen noise which originates from multi-domain activities in the MR element.

Numerous prior art biasing methods and apparatus for MR sensors have been developed which use both longitudinal and transverse bias, and these prior art biasing methods and apparatus have been generally effective to meet the prior art requirements. However, the continuing effort to increase recording density has led to the requirement for narrower recording tracks and increased linear recording density along the tracks. The small MR sensors which are necessary to meet these increasing requirements cannot always be made by using the prior art techniques because of competing bias requirements. On the one hand, the longitudinal bias must be strong enough for domain suppression and this bias produces a field along the MR element. On the other hand, the transverse bias field is normal to the longitudinal bias field, so the longitudinal bias field competes against the transverse bias field and the transverse data signal.

U.S. Pat. No. 4,663,685 and U.S. Pat. No. 4,771,349, both to Tsang, describe MR transducers employing both exchange coupling antiferromagnetic (AFM) layers which are in direct contact with the end regions of the MR sensor element to provide longitudinal bias to the structure, and a magnetic soft adjacent layer (SAL) parallel to and spaced from the central active region of the MR sensor element to provide a transverse bias to the active region. However, because of the small exchange field associated with the relatively small thickness of the MR sensor element described in the referenced patents, the edge regions of the MR element are subject to objectionable side reading from adjacent magnetic tracks.

U.S. Pat. No. 4,713,708 and U.S. Pat. No. 4,785,366, both to Krounbi et al, describe exchange stabilized MR transducers with patterned spacer layers such that the edge regions of both the MR element and a soft magnetic layer are pinned by exchange coupling films. These structures, like those of the patents discussed above, can experience the problem of side reading because of the small exchange field resulting from the relatively large thicknesses of the MR element and the soft magnetic layer.

U.S. Pat. No. 5,018,037, Krounbi et al, describes an MR transducer in which a contiguous junction is formed between the end regions of an MR element and hard magnet bias layers to stabilize magnetically the central active region of the MR element.

U.S. Pat. No. 5,285,339, Chen et al, describes an MR transducer utilizing a single soft magnetic film which is exchange coupled to an antiferromagnetic film for magnetic stabilization of the MR element.

SUMMARY OF THE PRESENT INVENTION

MR transducers with patterned sensor layers in the form of a trilayer structure, which includes an MR element, a spacer layer and an SAL, have the advantage of well-defined track resolution because the magnetically active end or wing regions of the sensor have been eliminated. In the present invention, a soft ferromagnetic (FM)/antiferromagnetic (AFM) multilayer biasing system is employed for end stabilization of the transducer. This multilayer system is electrically conductive, so that the current leads can be deposited directly on top of the biasing multilayer structure to define, together with the active region of the MR element, the active read track width. The identical multilayer FM/AFM system can also be employed to stabilize spin valve and bias giant magnetoresistive (GMR) multilayer structures as well.

The MR transducers proposed herein have patterned sensor layers stabilized by multilayer systems of soft FM and AFM exchange coupling films. The end stabilization multilayers are effectively inactive magnetically and serve as a biasing magnet. The stabilization multilayer structure may or may not be in contact with the side walls of the sensor layers. The use of multilayers of soft FM films exchange coupled to AFM films in accordance with this invention achieves the desired magnetic properties of a stabilization biasing magnet, in contrast to the use of hard bias magnets.

By properly selecting the thickness of the thin soft layer and the AFM layer and by multilayering a plurality of such soft/AFM layers of the selected thickness, large exchange pinning fields can be achieved to desensitize the edge region of the MR element, while the proper magnetostatic interaction strength can be maintained to render the sensor active region single domain. The multilayer biasing magnet can be in contact with the sensor side walls, in which case the stability of the active region will be further enhanced. The active read track-width is defined by either the current leads or the stabilizing magnet structure, or by both, thereby eliminating possible ambiguity of the side-reading termination points. This invention produces highly stable sensors with reduced side reading and improved off-track capability.

DESCRIPTION OF THE PREFERRED EMBODIMENT

Figure 1:
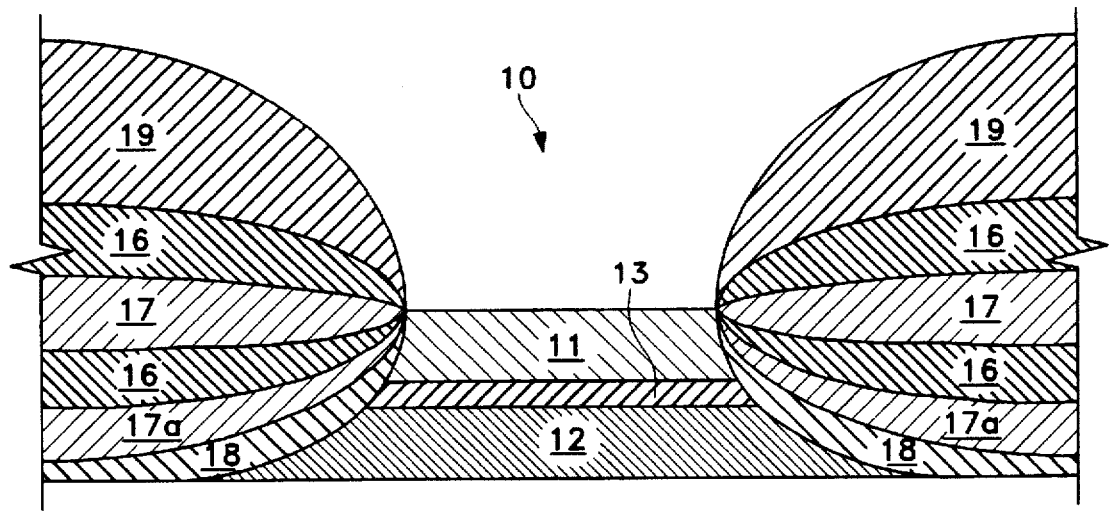
FIG. 1 is a partial cross-sectional view of one embodiment of an MR transducer, in accordance with the present invention.

With reference to FIG. 1, a read transducer 10 includes an MR sensor element 11 which is separated from a magnetic soft adjacent layer (SAL) 12 by a nonmagnetic spacer 13, as is well known in the art. Transducer 10 further employs a multilayer longitudinal biasing structure including a plurality of layers 16 of conductive antiferromagnetic material such as FeMn interleaved with a plurality of layers 17, 17a of soft ferromagnetic material such as NiFe. Layers 16, 17, 17a are in contact with each other. The first layer 17a may be deposited on a buffer layer 18, made of tantalum or copper. Upper layer 16 is overlaid by a conductive lead layer 19 which provides a path for sense current from a current source (not shown) through the multilayered structure to MR sensor element 11.

As discussed above, lead layer 19 may define the active read track width together with the active region of MR element 11. Layers 16, 17, 17a, 18 of FIG. 1 form contiguous junctions with the ends of MR element 11, as described in the above-cited U.S. Pat. No. 5,018,037. As is well known in the art, shield members (not shown in FIG. 1) may be employed to minimize the effects of stray magnetic flux which undesirably would reduce the resolution of the readback signal, and insulating layers can be utilized between these shield members and the active members of the transducer.

The multilayering of thin soft FM films, such as NiFe, and conductive AFM exchange films, such as FeMn, NiMn, IrMn, PtMn, PdMn, CoMn, RhMn and higher order alloys of these, achieves the following: first, by selecting a thin NiFe film, large exchange fields of up to 800 Oe for 30 Å NiFe can be obtained. Thus, the end biasing multilayers can have an extremely small susceptibility to external flux disturbances, and are therefore essentially inactive magnetically. This ensures that no side reading can occur from this region and propagate into the active region. Secondly, by selecting the proper NiFe total thickness, sufficient biasing strength Mrδ can be obtained to suppress Barkhausen noise sources and domain instabilities in the active sensor region. Additionally, the multilayer system will have an easy-axis loop with large squareness and remanence. The inter-granular magnetic fluctuation is minimized compared to a hard magnetic film (with or without an enhancement underlayer, such as CoCrPt on Cr). This eliminates noise sources within the biasing magnet itself.

Based on the above observations, a multilayer system as disclosed herein would have a superior performance compared to that of a simple hard bias film such as shown in the aforementioned U.S. Pat. No. 5,018,037 and that of a single soft film with exchange pinning as described in U.S. Pat. No. 5,285,339.

Figure 1A:
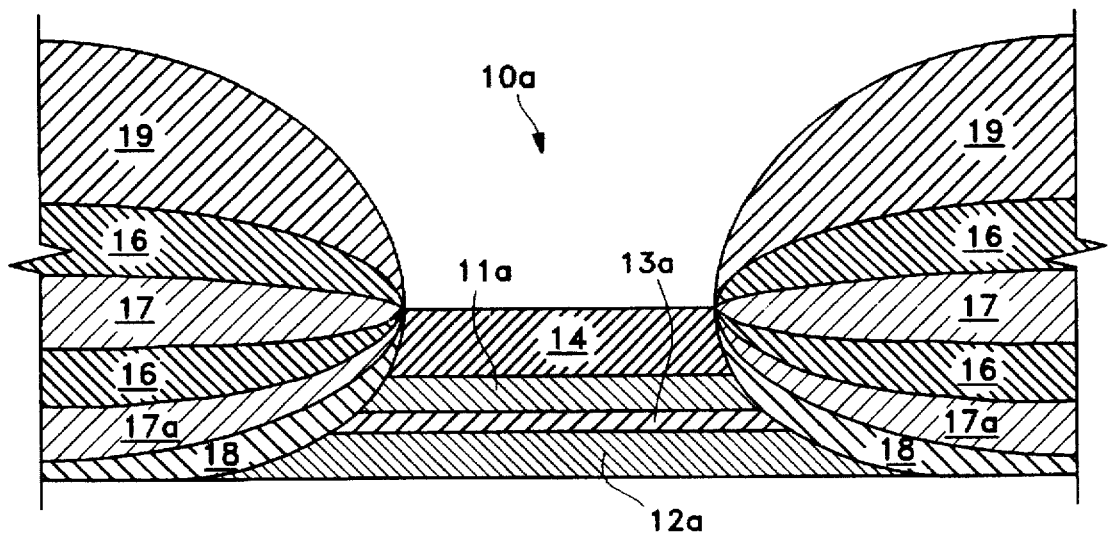
FIG. 1a is a partial cross-sectional view of an alternative embodiment of a spin valve structure.

FIG. 1a illustrates a magnetoresistive spin valve structure having an alternative central structure 10a instead of the central structure 10 of FIG. 1. The central structure includes an AFM layer 14, a pinned ferromagnetic layer 11a, a nonmagnetic spacer 13a and a free ferromagnetic layer 12a. The structure of FIG. 1a also includes conductive AFM layers 16, FM layers 17 and buffer layer 18 as in FIG. 1. However, the AFM layer 14 requires a substantially different blocking temperature than the blocking temperature of the AFM layer 16 so that the pinning directions of the materials of the AFM layers 14 and 16 can be made to be orthogonal to each other. In order to properly initialize the AFM materials, the temperature is raised above the highest blocking temperature in the presence of an external magnetic field H in the proper direction. The temperature is then lowered to an intermediate value between the two blocking temperatures, and the field H is rotated by 90°. Finally, the temperature is lowered to room temperature in the presence of H.

Figure 2:
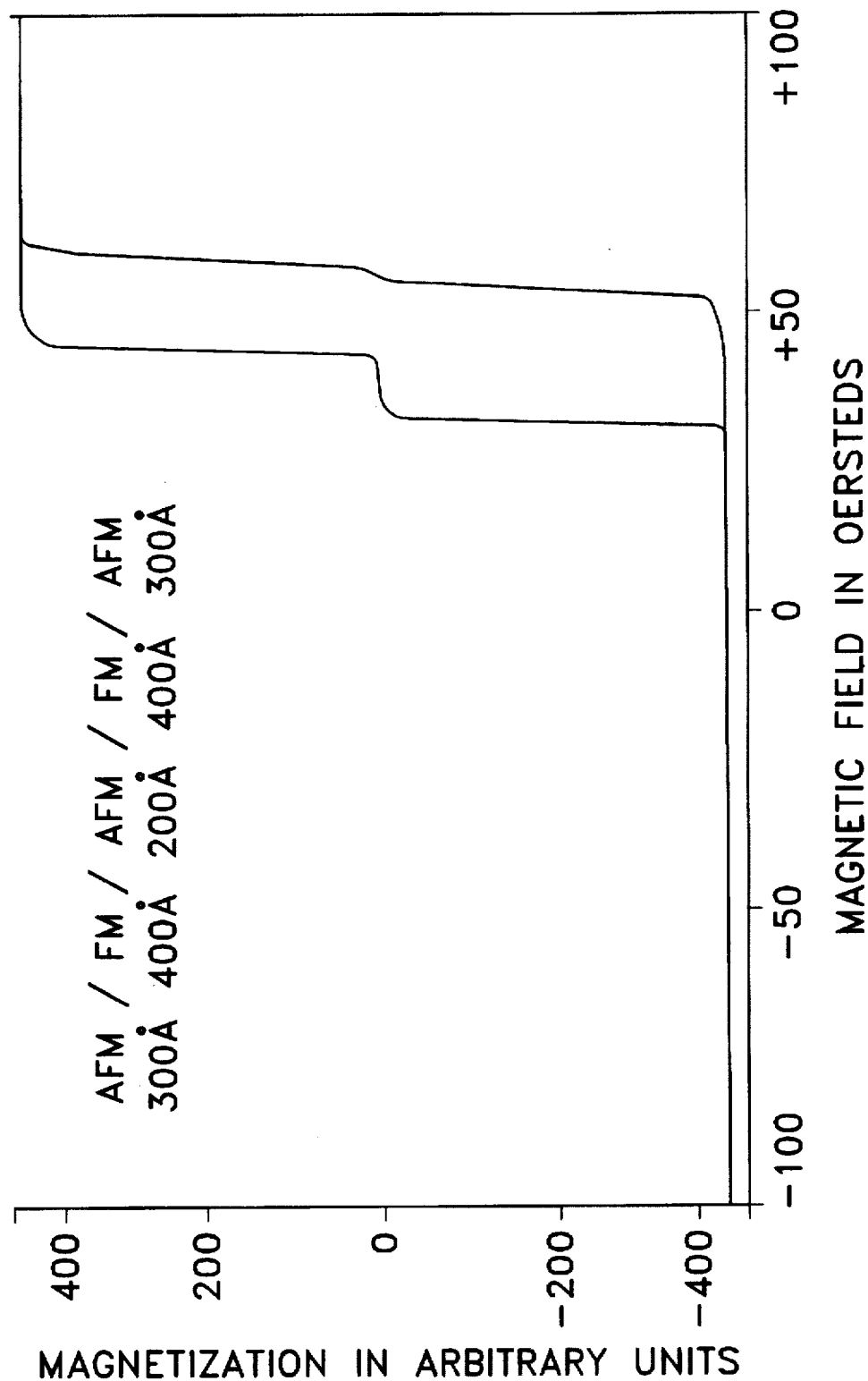
FIG. 2 is a graph illustrating the magnetic characteristics response of the multilayer structure described in this invention, this graph showing a highly square hysteresis loop disposed on one side of the H field axis.

FIG. 2 shows the measured easy-axis loop of a multilayer system of AFM/FM/AFM/FM/AFM in accordance with the present invention. The slight shift of the upper and lower halves of the loop in FIG. 2 indicates the difference of the pinning and magnetic properties of the two FM film layers. It is seen that the overall multilayer structure effectively acts as a single biasing magnet with a shifted easy-axis loop. By choosing a smaller FM thickness and an appropriate AFM film thickness, a much larger loop shift can be obtained.

Also, additional steps to increase the easy axis anisotropy field can be employed to make the present multilayer system less susceptible along its hard axis. This will ensure that the biasing magnet is magnetically inactive. Such steps include, but are not limited to, inducing a large negative magnetostriction of the NiFe films, or other soft magnetic films, in the end region in the presence of tensile stress, as described in the above-cited U.S. Pat. No. 5,285,339.

Figure 3:
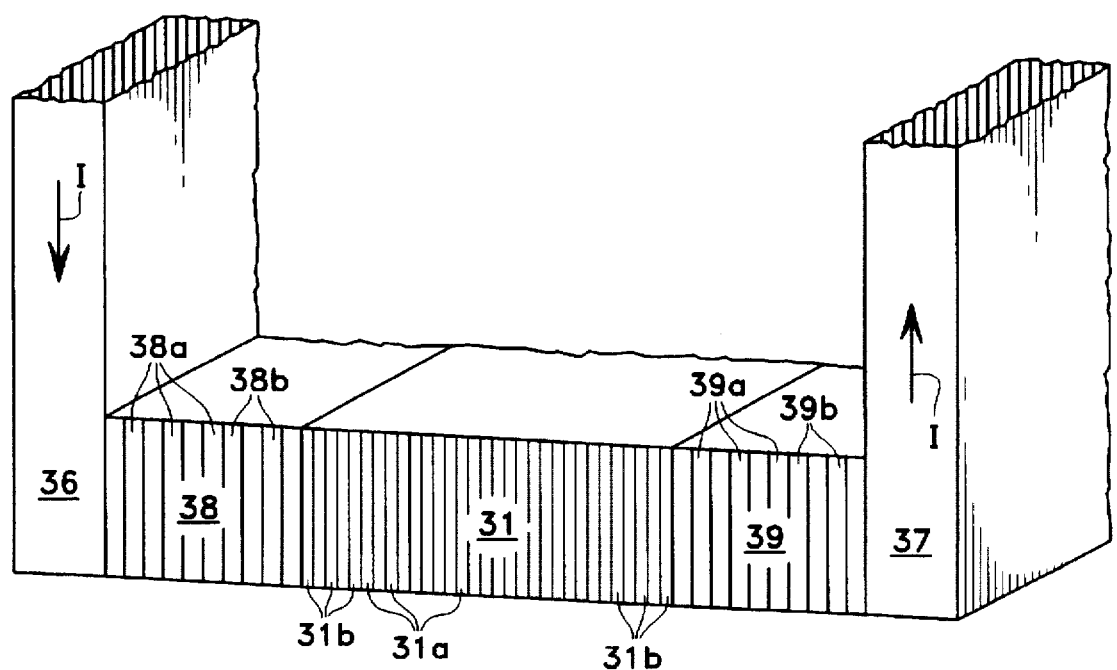
FIG. 3 is an isometric cross-sectional view of an alternate embodiment of the invention employing a GMR transducer operating in the current perpendicular-to-the-plane (CPP) mode.

The present invention may also be utilized in connection with transducers employing giant magnetoresistance (GMR). As is well known in the art, such GMR transducers produce output signals which can be considerably larger than those obtainable from conventional MR transducers. FIG. 3 illustrates one embodiment of such a configuration utilizing a GMR structure 31 operating in the current perpendicular-to-the-plane (CPP) mode. FIG. 3 includes multilayered biasing structures 38, 39 of this invention abutting the end surfaces of GMR structure 31. In FIG. 3, GMR structure 31 is represented as comprising layers 31a of ferromagnetic material such as Co, CoFe, NiFe, CoZrTa, CoZrNb, CoTaRh, NiPeCo or other alloys, alternating with layers 31b of nonmagnetic, conductive material such as Cu, Ag or the like.

Multilayered biasing structures 38, 39 are similar in structure to the multilayered biasing structures of FIG. 1 and may include FM layers 38a, 39a interleaved with AFM layers 38b, 39b respectively. Structures 38 and 39 serve as transverse biasing means for the CPP GMR sensor. Structures 38, 39 preferably include a relatively large number of the alternating layers 38a, 38b, 39a, 39b.

The sides of biasing structure 38, 39 are in electrical contact with shield members 36, 37 on the sides of members, 38, 39 which are away from GMR structure 31 to provide a path for sense current flow from a sense current source (not shown). As shown by the arrows, the current I flows through shield 36, multilayered bias structure 38, GMR structure 31, multilayered bias structure 39 and shield 37, to produce a current flow perpendicular to the planes of the layers 31a, 31b of GMR structure 31.

Figure 4:
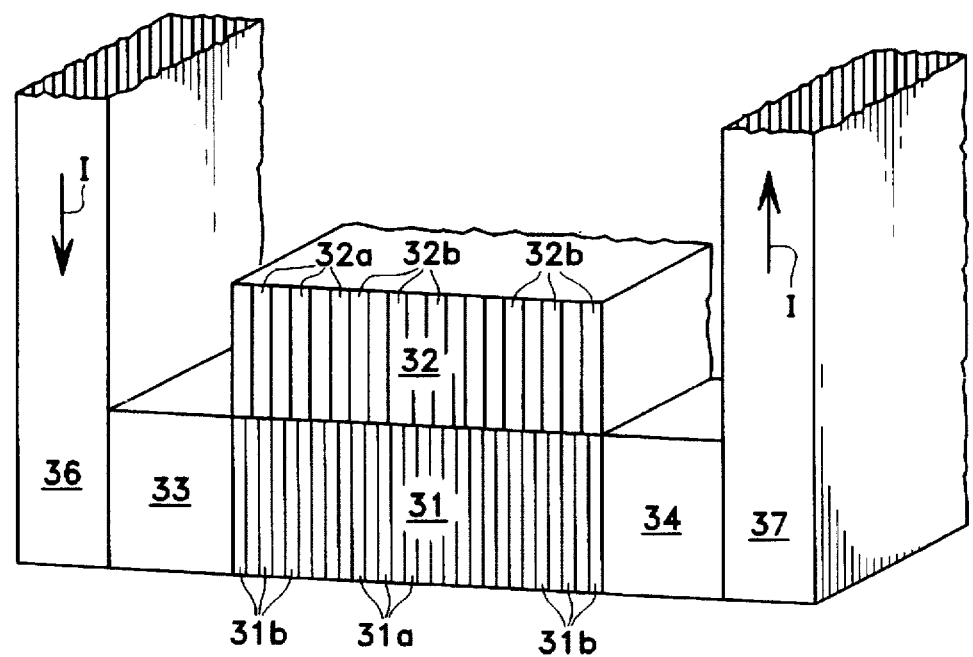
FIG. 4 is an isometric cross-sectional view of a further embodiment of the invention utilizing a GMR transducer operating in the CPP mode.

FIG. 4 illustrates an alternative embodiment of the invention with a GMR transducer operating in the CPP mode. Reference numeral 31 again designates a GMR structure which may be similar in function and composition to the GMR structure shown and described in the embodiment of FIG. 3. A multilayered biasing structure 32 is in contact with the top surface of GMR structure 31 which is spaced from and remote from the air bearing sensing surface of structure 31. Biasing structure 32 is coextensive with structure 31, and the facing surface of multilayered structure 32 is coplanar with the comparable surface of GMR structure 31.

Positioned adjacent each end of GMR structure 31 are electrical conductor layers 33, 34 which are coplanar with GMR structure 31. Shield members 36, 37, which are composed of a material which is electrically and magnetically conductive, such as Permalloy, are located in electrical contact with conductor layers 33, 34, respectively, to provide an electrical current path from a sense current source (not shown) through the elements of FIG. 4. The path of this current, represented by arrows I, extends through shield member 36, conductor layer 33, GMR structure 31, conductor layer 34, and shield member 37. This path produces a current flow perpendicular to the planes of layers 31a, 31b in GMR structure 31.

There are additional numerous alternate embodiments of this invention which involve exchange coupling between the multilayer biasing magnet structure and the side walls of the MR films. In the embodiment of FIG. 1, the bottom exchange film is in contact with the sensor trilayer. In that configuration, the additional exchange coupling exerted on the MR sensor edges by the AFM film will enhance the stability of the active region. In one alternate embodiment, the bottom AFM layer may be directly deposited on the side walls of the sensor. The contact between this AFM layer and the trilayer side wall of the MR structure also provides an exchange coupling which serves the same purpose as in the first embodiment.

In a further additional embodiment, an additional spacer layer such as Ta at least 20–50 Å thick is deposited before depositing the multilayers, to separate the interface contact between the biasing magnet structure and the sensor element. Thus, the longitudinal stabilization is provided mostly by magnetostatic interaction. Such an embodiment also fulfills the goal of inducing a single domain response in the active region.

Alternatively, soft FM materials of Hc≦100 oe that can exchange couple to AFM materials such as FeMn, NiMn, IrMn, PdMn, PtMn, RhMn, CrMn, or higher order alloys thereof, can be effectively used as well, with the result that an overall thinner alternative structure of AFM/FM material may be employed.

What is claimed is:

1. A read transducer assembly comprising:

a magnetoresistive structure having a top surface, a bottom surface and end surfaces; and multilayered biasing structures including alternating layers of antiferromagnetic material and layers of soft magnetic material in contact with said antiferromagnetic material;

said multilayered biasing structures being located adjacent to and in magnetic contact with said end surfaces of said magnetoresistive structure.

2. A read transducer assembly in accordance with claim 1 wherein said antiferromagnetic material is selected from the group comprising FeMn, NiMn, IrMn, PdMn, PtMn, RhMn, CrMn, and higher order alloys thereof.

3. A read transducer assembly in accordance with claim 1 in which said soft magnetic material is selected from NiFe, NiFeCo, Co, CoZrTa, CoZrNb, CoZrRh and CoFe.

4. A giant magnetoresistive multilayer read transducer assembly having an air bearing surface and operative in a current-perpendicular-to-the-plane mode comprising:

a giant magnetoresistive multilayer structure having electrical conductive terminal ends;

a plurality of conductor elements that are coplanar with and adjacent to said giant magnetoresistive multilayer structure;

said terminal ends of said giant magnetoresistive multilayer structure being electrically connected to said conductor elements;

electrically conductive magnetic shields of soft magnetic material in electrical contact with said conductor elements; and a multilayer biasing structure of alternating layers of ferromagnetic and antiferromagnetic material co-extensive with said giant magnetoresistive structure and located at a surface of said giant magnetoresistive structure remote from said air bearing surface for providing a bias field to said giant magnetoresistive multilayer structure.

5. A read transducer assembly in accordance with claim 4 wherein said antiferromagnetic material is selected from FeMn, NiMn, IrMn, CrMn, PdMn, PtMn, RhMn, and higher alloys thereof, or from NiO, CoO or NiCoO.

6. A giant magnetoresistive read transducer comprising:

a giant magnetoresistive structure having end terminals;

multilayered biasing structures formed with alternating layers of antiferromagnetic material and soft magnetic layers, said antiferromagnetic layers and said soft magnetic layers being coplanar with said giant magnetoresistive structure; and magnetic shield members for providing electrical contacts to said multilayer biasing structures for sensing signals from said giant magnetoresistive transducer.

7. A read transducer assembly in accordance with claim 6 wherein said antiferromagnetic material is selected from FeMn, NiMn, IrMn, CrMn, RhMn, PdMn, PtMn and higher alloys thereof.

8. A read transducer assembly in accordance with claim 6 in which said soft magnetic material is selected from NiFe, NiFeCo, Co, CoZrTa, CoZrNb, CoZrRh and CoFe.

* * * * *